(12) United States Patent
Jacobsen et al.

(10) Patent No.: US 8,182,227 B2
(45) Date of Patent: May 22, 2012

(54) WIND TURBINE BLADE WITH LIGHTNING RECEPTOR

(75) Inventors: Eric M. Jacobsen, Greenville, SC (US); Ronald Eduard Stam, Overijssel (NL); Nicholas K. Althoff, Ware Shoals, SC (US); Matthew Gann, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1147 days.

(21) Appl. No.: 12/024,888

(22) Filed: Feb. 1, 2008

(65) Prior Publication Data
US 2009/0196751 A1    Aug. 6, 2009

(51) Int. Cl.
*F03D 11/00* (2006.01)

(52) U.S. Cl. .................... 416/146 R; 416/230

(58) Field of Classification Search .............. 415/118; 416/61, 62, 146 R, 226, 230
See application file for complete search history.

(56) References Cited

U.S. PATENT DOCUMENTS

| | | | |
|---|---|---|---|
| 6,457,943 B1 | 10/2002 | Olsen et al. | |
| 6,979,179 B2 | 12/2005 | Moller Larsen | |
| 7,249,935 B2 | 7/2007 | Pedersen | |
| 7,651,320 B2 * | 1/2010 | Hansen | 416/1 |
| 7,883,321 B2 * | 2/2011 | Bertelsen | 416/146 R |
| 2009/0053062 A1 * | 2/2009 | Arinaga et al. | 416/146 R |

* cited by examiner

*Primary Examiner* — Nathaniel Wiehe
(74) *Attorney, Agent, or Firm* — McNees Wallace & Nurick LLC

(57) ABSTRACT

A wind turbine blade having two shell portions bonded together to form a wind turbine blade having an interior space having an axial length. A web disposed between the shell portions in the interior space and extending substantially the axial length thereof. Lightning receptors are disposed on the shell portions and a conductor is disposed in the interior space. The conductor is configured to contact the lightning receptors. One shell portion of the two shell portions has a removable section, e.g. a plug, receptor or panel, to provide access to the opposite conductor. A cable mounted on the web is configured to extend substantially the axial length of the wind turbine blade and is in electrical contact with the conductor.

20 Claims, 4 Drawing Sheets

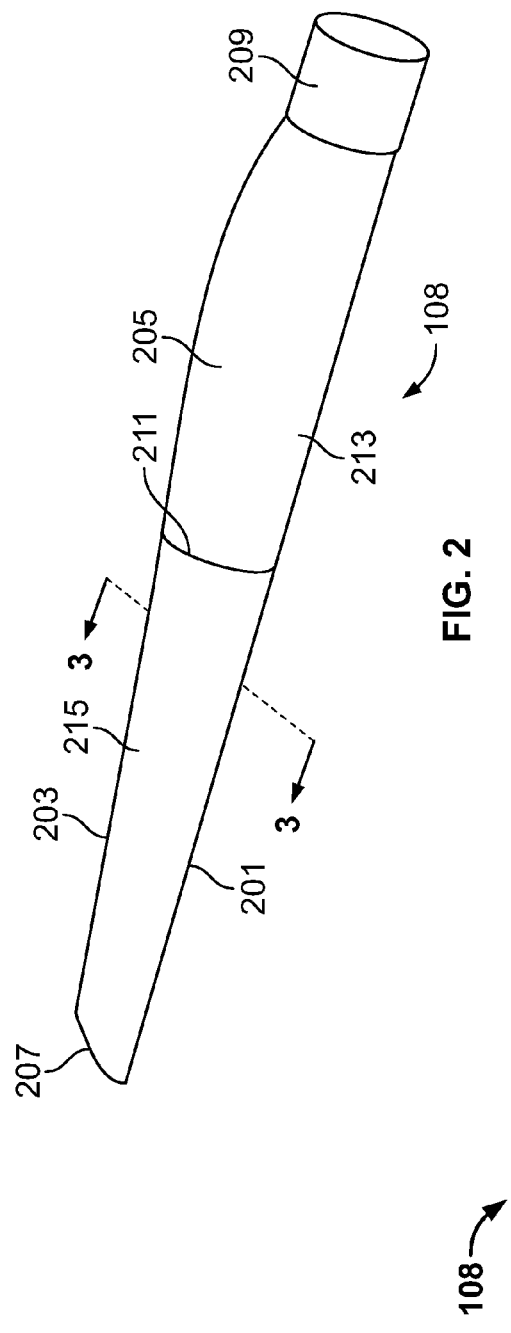
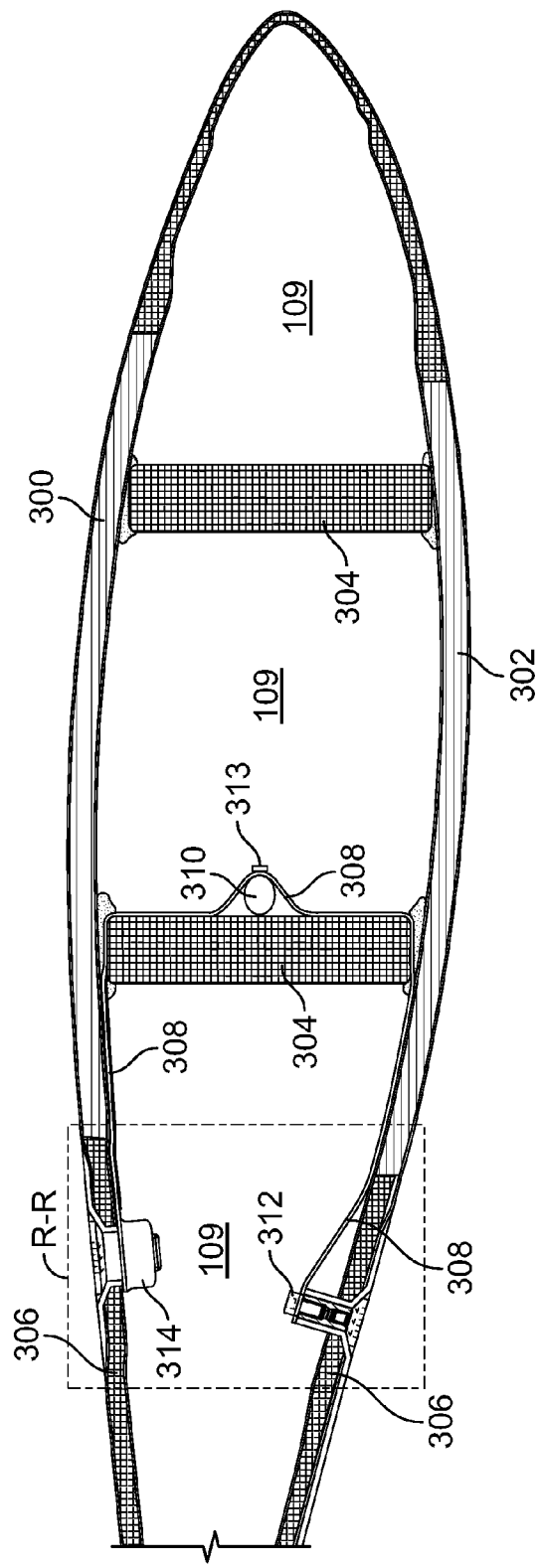

WIND TURBINE BLADE WITH LIGHTNING RECEPTOR

FIELD OF THE INVENTION

The present invention relates generally to wind turbines. More specifically, the present invention relates to a wind turbine blade including a lightning receptor within the blade and access to the receptor in the turbine blade.

BACKGROUND OF THE INVENTION

It is known to provide wind turbine rotor blades with lightning protection systems to protect them from strokes of lightning. For example, a rotor blade may be provided with a lightning receptor of an electrically conductive material. The lightning receptor may capture a strike of lightning and conduct the current through a lightning conductor cable extending in the longitudinal direction of the blade to a ground in the tower.

Generally, a wind turbine includes a plurality of blades coupled to a rotor through a hub. The rotor is mounted within a housing or nacelle, which is positioned on top of a tubular tower or base. Utility grade wind turbines (i.e. wind turbines designed to provide electrical power to a utility grid) can have large rotors (e.g., thirty or more meters in diameter). Blades on these rotors transform wind energy into a rotational torque or force that drives the rotor of one or more generators, rotationally coupled to the rotor. The rotor is supported by the tower through a bearing that includes a fixed portion coupled to a rotatable portion. The bearing is subject to a plurality of loads including the weight of the rotor, a moment load of the rotor that is cantilevered from the bearing, asymmetric loads, such as, horizontal and shears, yaw misalignment, and natural turbulence.

Typically, two shells, a suction shell and a pressure shell, are bonded together to form a wind turbine blade. Since the wind turbine blades are so large and are disposed in open areas, they attract and are often hit by lightning. Currently, each shell has one or more lightning receptors with a conductor cable or strip running the length of the blade along the inside surface of the blade. The multiple conductor cables require each of the conductor cable to be disposed along the shells in high stress areas, leaving room for errors and failure. Therefore, it would be desirous to have a single conductor cable for both shells instead of multiple conductor cables. However, access to the inside of the blade is limited after the shells are bonded, therefore it is difficult to connect the a receptor with one single conductor. Often the installer must insert their arms through the two shells while they are still in the molds, exposing themselves to the danger of one of the heavy shells falling from the mold and causing harm to the installer.

Therefore, what is needed is a method and system for providing access to the inside of the blade once the shells are bonded so that one common conductor cable may be used for the lightning receptor.

SUMMARY OF THE INVENTION

The object of the present invention is to provide a new an improved lightning protection of wind turbine rotor blades.

According to a first embodiment of the invention a wind turbine blade having a blade with two sides, an interior space having a center, and an axial length is disclosed. The embodiment also discloses a web disposed in the interior space of the blade extending substantially the axial length of the blade, lightning receptors disposed on the two sides of the blade and a conductor disposed in the interior space of the blade configured to contact the lightning receptors. One side of the two sides has a removable section to provide access to at least one lightning receptor of the lightning receptors.

According to another embodiment of the invention, a wind turbine blade having two shell portions bonded together to from an interior space having a center and an axial length is disclosed. A web disposed between the shell portions in the interior space extending substantially the axial length is also disclosed. The embodiment further includes lightning receptors disposed on the two sides of the blade and a conductor disposed in the interior space of the blade configured to contact the lightning receptors. One shell of the two shells has a removable section to provide access to at least one lightning receptor of the lightning receptors.

According to a second embodiment of the invention, a method for a lightning receptor in a wind turbine blade is disclosed. The method includes the steps of providing two shell portions, one shell portion being a top shell portion and the second shell portion being a bottom shell portion and securing a web to the top shell portion, each shell portion of the two shell portions having a lightning receptor. The method also includes securing a conductor to the web, securing a conductor to the lightning receptor of the top shell portion and bonding the two shell portions together to form a wind turbine blade. The next step of the method includes removing a removable section from one of the shell portions creating an access port, securing the conductor to the bottom shell portion by access through the access port and replacing the removable section to the shell portion.

An advantage of the present invention is that the installation of the common conductor wire for both receptors is safer because the common conductor wire is installed after the shells are removed from the molds.

Another advantage of the present invention is that the installation of the common conductor wire for both receptors is easier because the common conductor wire is installed through a port in the blade shell and not in an opening between the two shells before the shells are bonded.

Yet another advantage of the present invention is that a common conductor wire for both receptors is cheaper because only one conductor is used.

Still another advantage of the present invention is a more reliable lightening protection system exists because the common conductor wire is not exposed to the stresses of the shell during operation of the wind turbine.

Further aspects of the method and system are disclosed herein. The features as discussed above, as well as other features and advantages of the present invention will be appreciated and understood by those skilled in the art from the following detailed description and drawings.

BRIEF DESCRIPTION OF THE DRAWINGS

FIG. 2 shows a top perspective view of a wind turbine blade according to an embodiment of the present disclosure.

FIG. 3 shows a cross sectional view of a wind turbine blade and a lightning receptor according to an embodiment of the present disclosure.

Wherever possible, the same reference numbers will be used throughout the drawings to refer to the same or like parts.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
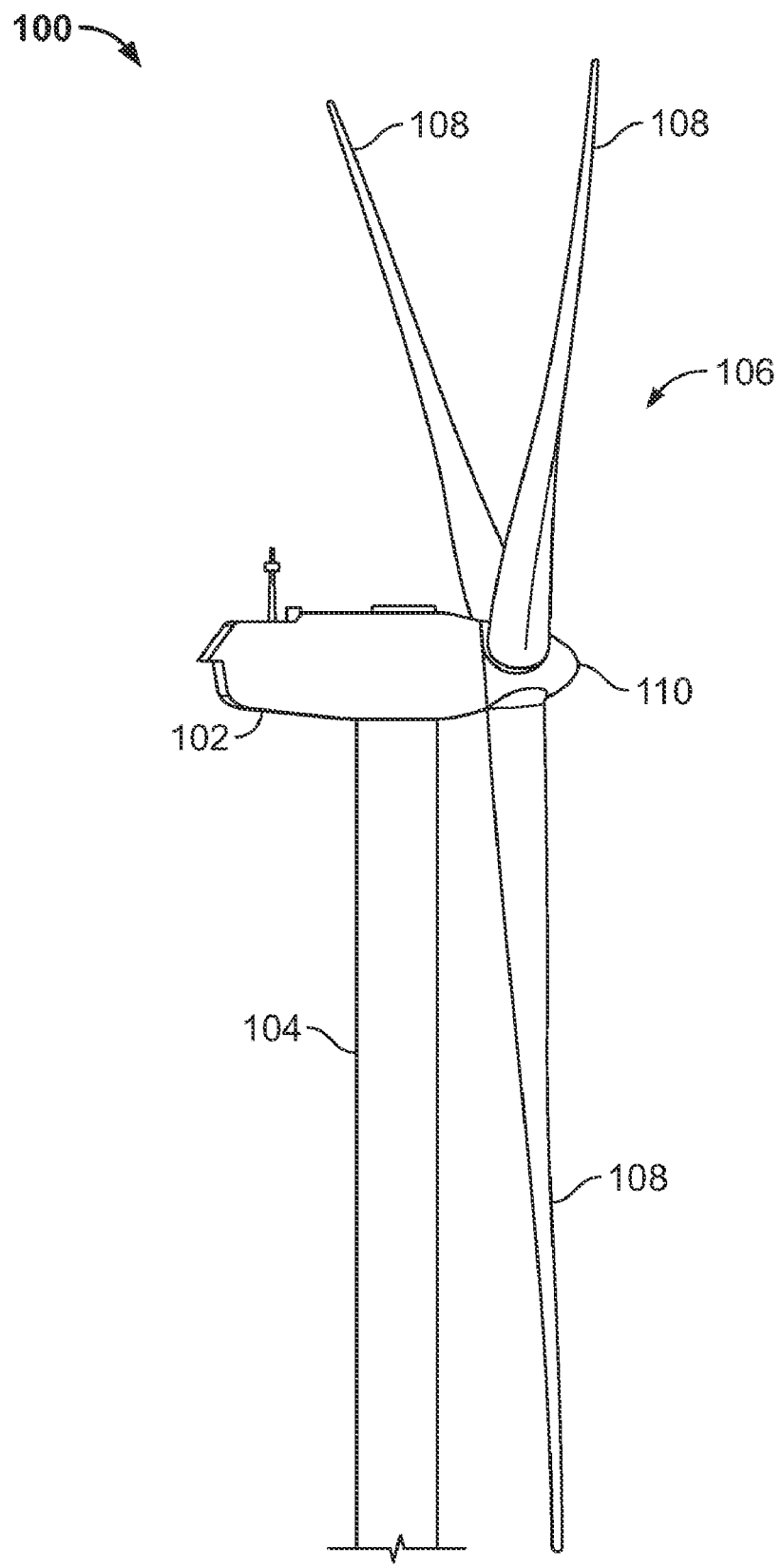
FIG. 1 shows a side elevational view of a wind turbine according to an embodiment of the present disclosure.

FIG. 1 shows a wind turbine 100 having a nacelle 102 housing a generator (not shown in FIG. 1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present disclosure.

FIG. 2 illustrates a turbine blade 108 according to an embodiment of the present disclosure having a leading edge 201 and a trailing edge 203. The turbine blade 108 includes an airfoil portion 205 extending from the tip 207 to the root 209, which is connectable to the hub 110 of the wind turbine. The blade includes a bonded joint 211 dividing a first segment 213 of the blade 108 from the second portion of the blade 108. The first segment 213 and the second segment 215 are segments of the blade 108, which are assembled together to provide a complete blade 108. By segment, it is meant that the wind turbine blade 108 is divided into a plurality of components that, when assembled together, form a complete blade 108. Although FIG. 2 shows a blade 108 having two segments, the disclosure is not limited to two segments. For example, blade 108 may be a single segment or divided into any number of segments including three or more segments.

FIG. 3 illustrates a cross sectional view of the wind turbine blade 108 of FIG. 2. The wind turbine blade 108 includes a pressure shell 300 and a suction shell 302. Each shell portion 300, 302 forms a portion of the wind turbine blade 108. The shell portions 300, 302 are bonded together to form the wind turbine blade 108 having an interior space 109. While the embodiment described herein refers to a wind turbine blade having two shell portions 300, 302, it is appreciated by one of ordinary skill that the wind turbine blade may be formed by more than two shell portions, or alternatively, may be one unitary shell. When the shell portions 300, 302 are bonded together to form the wind turbine blade 108, the shell portions 300, 302 create an interior space having a center and an axial length. The center being defined as the plane disposed midway between each shell portion 300, 302.

Two webs 304 are disposed between the bonded shells 300, 302 in the interior space and extend substantially the axial length of the wind turbine blade 108. While FIG. 3 illustrates two webs 304, one or more than two webs 304 may be included. The webs 304 are constructed from a substantially rigid structure that provides structural support to the wind turbine blade 108 during operation. The substantially rigid structure may be formed of a substantially rigid material, e.g. fiberglass. While the webs 304 are shown as being generally rectangular in cross section, it should be apparent to one of ordinary skill that the cross section of the web 304 may be any other suitable geometry. The webs 304 prevent the shells 300, 302 of the wind turbine blade 108 from shearing or breaking due to stresses and bending during new paragraph operation of the wind turbine.

A lightning receptor 306 is disposed on the suction shell 302 and the pressure shell 300 of the wind turbine blade 108 as shown in FIG. 3. The lightning receptor 306 is an electrically conductive material suitable to withstand an electrical charge from a bolt of lightening or several bolts of lightning. While the lightning receptors 306 are shown as being integral with the pressure shell 300 and suction shell 302 of the wind turbine blade 108, the lightning receptor may be several sections, or maybe a separate structure from the pressure shell 300 and the suction shell 302. An electrically conductive conductor 308 extends from the web 304 to the lightning receptors 306 on each shell portion 300, 302. The conductor 308 may be a wire or a conductive strip, or any other suitable electrically conductive material. In addition, the conductor 308 may be one unitary piece, two separate pieces, or multiple pieces. The conductor 308 is secured to the lightning receptors 306 with fasteners 312, 314. A cable 310 is mounted to the web 304 and extends along the web 304 for substantially the axial length of the interior space 109. The cable 310 may be positioned approximately at the center of the interior space to extend for substantially the axial length thereof. However, in alternative embodiments, the cable may be disposed within the interior space not substantially touching either of the shell portions 300, 302 for substantially the axial length of the interior space. A fastener 313, e.g. a crimp or clamp, is used to secure the cable 310 to the web 304 and the conductor 308 as can be appreciated from FIG. 3. Only one cable 310 is necessary to ground the lightning receptors 306, because the cable 310 contacts the conductor 308, which is connected to the lightning receptors 306. The cable 310 is disposed on the web 304 such that the cable 310 does not contact either of the shell portions 300, 302. It should appreciated that the cable 310 may be formed of a single cable or multiple connected cables.

Figure 4:
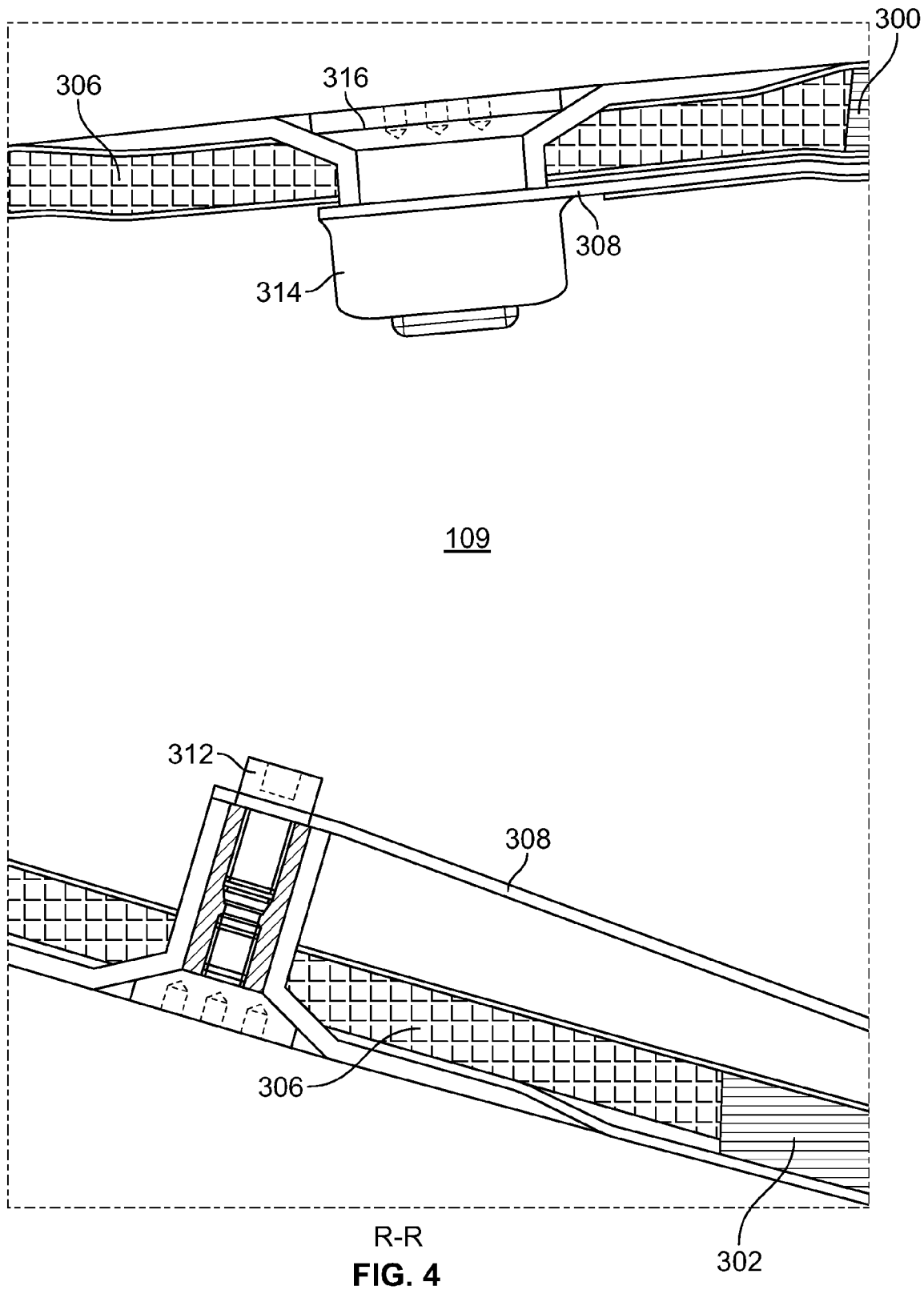
FIG. 4 shows view R-R from FIG. 3, which is an enlarged view of the receptor connections with the blade shells according to an embodiment of the present disclosure.

Also shown in FIG. 3, and in more detail in FIG. 4, the conductor 308 is secured to the lightning receptor 306 on the suction shell 302 with a fastener 312. The conductor 308 has an aperture (not shown) in which the fastener 312 is disposed through. The fastener 312 ensures that the conductor 308 makes electrically conductive contact with the lightning receptor 306. The fastener 312 may be a screw or other similar or suitable fastener. The conductor 308 is secured to the lightning receptor 306 on the pressure shell 300 with a fastener 314. The conductor 308 has an aperture (not shown) in which the fastener 314 is disposed through. The fastener 314 ensures that the conductor 308 makes electrically conductive contact with the lightning receptor 306. The fastener 314 may be a nut or other similar or suitable fastener. A removable section 316 is disposed in the pressure shell 300 such that when removed, an access port 318 (shown in FIG. 5) is formed that allows access to the interior space 109 of the wind turbine blade 108. The removable section 316 may be a bolt, a portion of the pressure shell 300, a plug, a receptor, a panel or another suitable portion of the wind turbine blade 108.

During assembly of the wind turbine blade 108, the web 304 is secured to the pressure shell 300. Next, the cable 310 and conductor 308 are secured to the web 304. The conductor 308 is secured to the lightning receptor 306 on the pressure shell 300. Then, the pressure shell 300 and the suction shell 302 are bonded together to form the wind turbine blade 108 having interior space 109. The removable section 316 is removed from the pressure shell 300 to provide an access port 318 (FIG. 5) to access the interior space 109 of the wind turbine blade 108. A user may then insert a tool 320 or other object, e.g. a hand, into the access port 318 to secure the conductor 308 to the lightning receptor 306 on suction shell 302.

Figure 5:
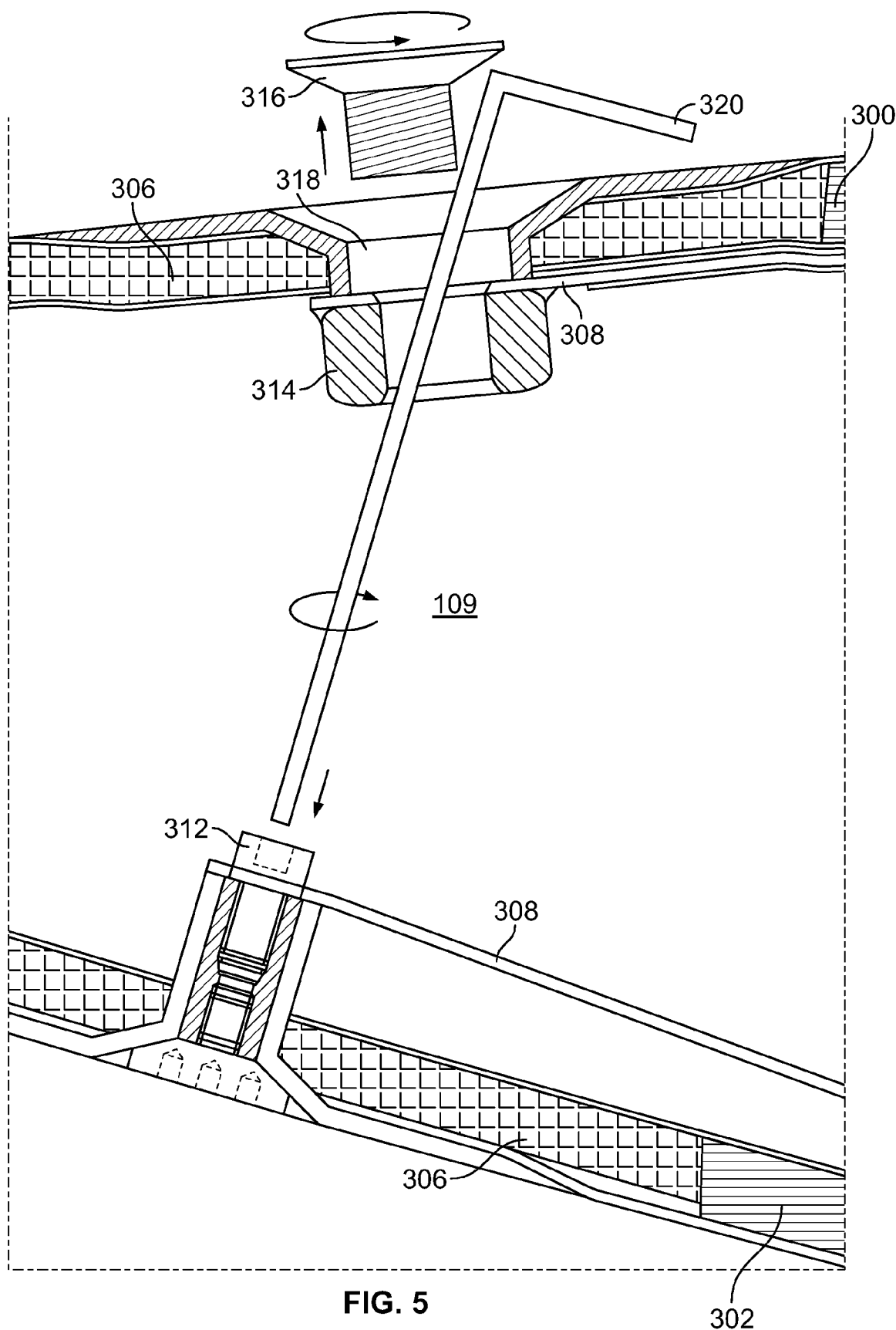
FIG. 5 shows an enlarged view of an alternate embodiment of the receptor connections with the blade shells according to the present disclosure.

FIG. 5 shows an embodiment of the present invention where a tool 320, e.g. a wrench, is inserted through the access port 318 to secure the conductor 308 to the lightning receptor 306 on suction shell 302. Once the conductor 308 is secured to the lightning receptor 306 on the suction shell 302, the removable section 316 is replaced and secured to the pressure shell 300. The removable section 316 may be removed if necessary to perform maintenance or repairs to the lightning receptors 306. Alternatively, the removable section 316 may fixed in place by gluing or other permanent fastening methods While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A wind turbine blade, comprising:
   a blade comprising two sides, an interior space having a center and an axial length;
   a web disposed in the interior space of the blade, the web extending substantially the axial length of the blade;
   lightning receptors disposed on the two sides of the blade; and
   a conductor disposed in the interior space, the conductor configured to contact the lightning receptors;
   a cable disposed in the interior space connected to the conductor
   wherein one side of the two sides have a removable section to provide access to at least one lightning receptor of the lightning receptors.

2. The wind turbine blade of claim 1, wherein the blade further comprises two shell portions bonded together.

3. The wind turbine blade of claim 2, wherein the two shell portions comprise a suction shell and a pressure shell.

4. The wind turbine blade of claim 3, wherein the pressure shell has the removable section to provide access to the at least one lightning receptor.

5. The wind turbine blade of claim 1, wherein the cable is disposed in the center of the interior space.

6. The wind turbine blade of claim 1, wherein the cable extends along the web for substantially the axial length of the blade.

7. The wind turbine of claim 1, wherein the removal of the removable section creates an access port providing access to the conductor.

8. A wind turbine blade, comprising:
   two shell portions bonded together to form a blade having and interior space having a center and an axial length;
   a web disposed between the two shell portions in the interior space, the web extending substantially the axial length of the interior space;
   lightning receptors disposed on the two shell portions; and
   a conductor disposed in the interior space, the conductor configured to contact the lightning receptors;
   a cable disposed in the interior space and connected to the conductor;
   wherein one shell portion of the two shell portions has a removable section to provide access to at least one lightning receptor of the lightning receptors.

9. The wind turbine blade of claim 8, wherein the two shell portions comprise a suction shell and a pressure shell.

10. The wind turbine blade of claim 9, wherein the pressure shell has the removable section to provide access to the at least one lightning receptor.

11. The wind turbine blade of claim 8, wherein the cable is disposed in the center of the interior space.

12. The wind turbine blade of claim 8, wherein the cable extends along the web for substantially the axial length of the interior space.

13. The wind turbine of claim 8, wherein the removal of the removable section creates an access port providing access to the conductor.

14. A method for providing a lightning receptor in a wind turbine blade, comprising the steps of:
   providing a top shell portion having a lightning receptor and a bottom shell portion having a lightning receptor;
   securing a web to the top shell portion;
   securing a conductor to the web;
   securing the conductor to the lightning receptor of the top shell portion;
   bonding the top shell portion to the bottom shell portion to form a wind turbine blade having an interior space having a center and an axial length;
   removing a removable section from either the top shell portion or the bottom shell portion to create an access port;
   securing the conductor to the lightning receptor of the bottom shell portion by access through the access port; and
   replacing the removable section to either the top shell portion or bottom shell portion from which the removable section was removed.

15. The method of claim 14, wherein the top shell portion is a pressure shell.

16. The method of claim 15, wherein the bottom shell portion is a suction shell.

17. The method of claim 16, wherein the step of removing the removable section further comprises removing the removable section from the pressure shell.

18. The method of claim 14, wherein the conductor is connected to a cable disposed at the center of the interior space and which extends substantially the axial length.

19. The method of claim 14, wherein the step of securing the conductor to the bottom shell portion further comprises inserting a user's hand through the access port.

20. The method of claim 14, wherein the step of securing the conductor to the bottom shell portion further comprises inserting a tool through the access port.

* * * * *